April 10, 1928.  V. E. HOFMANN ET AL  1,665,362
GLASS FEEDER
Filed March 27, 1924
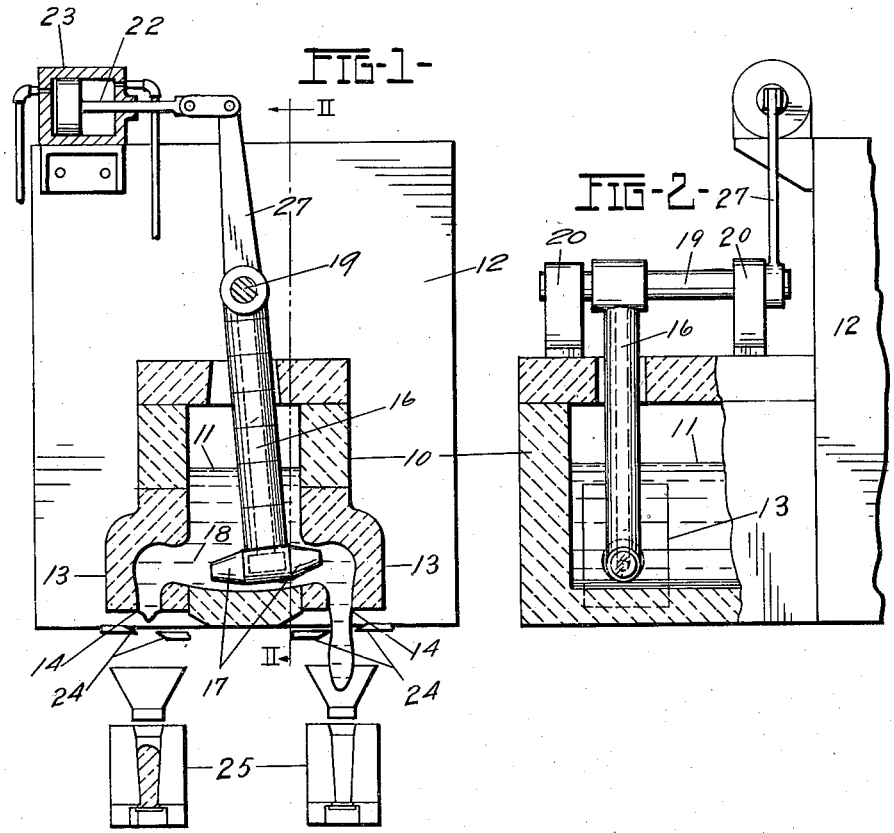
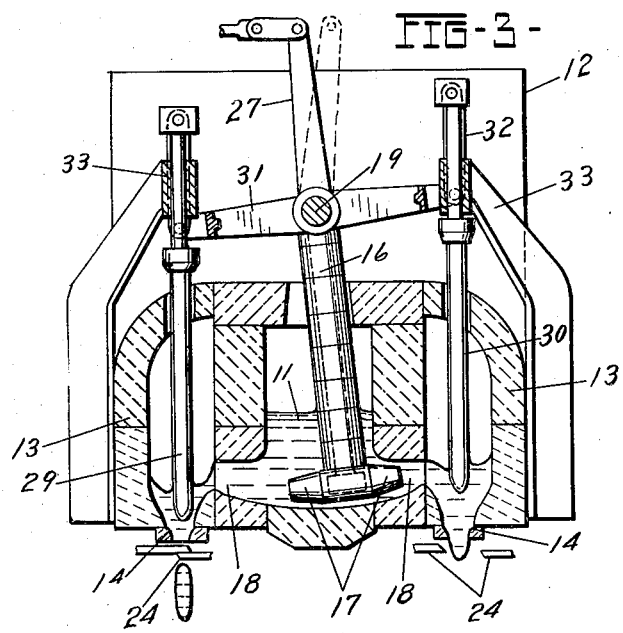
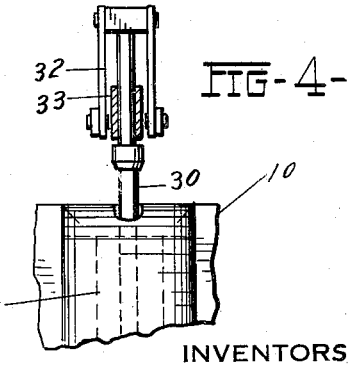
INVENTORS
Victor E. Hofmann
AND
Leonard D. Soubier
BY J. F. Rule,
THEIR ATTORNEY.

Patented Apr. 10, 1928.

1,665,362

UNITED STATES PATENT OFFICE.

VICTOR E. HOFMANN AND LEONARD D. SOUBIER, OF TOLEDO, OHIO, ASSIGNORS TO THE OWENS BOTTLE COMPANY, OF TOLEDO, OHIO, A CORPORATION OF OHIO.

GLASS FEEDER.

Application filed March 27, 1924. Serial No. 702,281.

The present invention relates to an apparatus for feeding charges of molten glass, and in particular to an apparatus wherein the glass issues from outlets in the bottom of a container and is controlled in its issuance therethrough by means of a reciprocating regulator member.

An object of our invention is to provide a feeder wherein the movement of the reciprocating regulator member in either direction is utilized to its fullest extent, for the expulsion of mold charges to be delivered direct to the molds of a forming machine, or for the transferring of measured quantities of glass to an auxiliary discharging chamber.

A further object is the provision of a glass feeding device whereby charges of molten glass may be alternately fed to the molds of two separate blowing machines, and controlled in its delivery thereto by means of a single regulating member.

In the accompanying drawings:

Figure 1 is a front sectional elevation of the apparatus in its preferred form.

Figure 2 is a part sectional elevation taken at about the line II—II on Figure 1.

Figure 3 is a front sectional elevation of a modified construction.

Figure 4 is a view showing a portion of the plunger operating connections.

A furnace boot or extension 10 (Figs. 1 and 2) is continuously supplied with molten glass 11 from a furnace 12. The outer end of the boot 10 is formed with lateral extensions providing chambers or closed spouts 13 having outlet openings 14 in the bottoms thereof through which the glass issues. Projecting downward into the glass in the boot 10 is an impeller arm 16 having formed at its lower end a cross-head comprising two frusto-conical projections 17 aligned with the channels or passageways 18 leading from the body of the boot into the chambers 13.

The arm 16 is fixed to a horizontally disposed rock shaft 19 mounted for oscillation in bearings 20. An arm 27 secured to said shaft is connected to the piston 22 of an air motor 23. The motor operates through these connections to oscillate the arm 16 and cause the regulator or impeller 17 to force out charges or gobs of glass alternately from the outlets 14. The regulator as it withdraws from a channel 18, applies a temporary retarding force to the glass flowing in the channel. This force slows down the flow and may, if desired, be sufficient to stop or reverse the flow. The gobs are then severed by means of shears 24 disposed beneath the outlets 14, and dropped into molds 25 of the forming machines. Any well known or approved form of shears may be used in connection with this device.

Referring to Figures 3 and 4, there is shown a modification wherein regulating plugs 29 and 30 are mounted for vertical reciprocation above and in alignment with the outlets 14 of the chambers 13, the lower ends of said chambers forming wells to receive the flow of glass from the channels 18. A yoke-shaped rocker arm 31, secured to the rock shaft 19, is connected to the plugs 29 and 30 through links 32, thereby supplying connections for actuating said plugs. Bearing brackets 33 are arranged to guide the regulating plugs in their vertical movements. The clay regulator arm 16 is also secured to the rock shaft 19 and at right angles to the rocker arm 31. Therefore, it will be seen that as the air motor 23 through its connections, moves the arm 16 in one direction, one of the vertical regulators will be lifted and the opposite one lowered, the movements of the regulators being reversed as the arm 16 moves in the other direction.

Beginning with the parts as shown in Figure 3, the operation will be as follows:

As air is admitted to the rear end of the air motor 23, the arm 16, through lever 27, will be shifted from the right hand position to the left hand position.

As the cone-shaped portion 17 leaves the opening 18 of the chamber 13, the outward movement of the glass through said opening will be retarded, and at the same time the plug 30 will begin to move downward, forcing out a quantity of glass through the discharge outlet 14.

As the regulator arm 16 is moving away from one side to the opposite, it is not only retarding the flow through one outlet 18, but is at the same time accelerating the flow through the opposite outlet. Further, the vertical regulators 29 and 30 and the transversely moving regulator 16 assist each other, in that, as the regulator 16 forces the glass into a chamber 13, the corresponding vertical regulator is moving upwards, tending to pull the glass through the adjacent opening 18. It will also be noted that when the regulator 16 is moving away from a channel 18, the corresponding vertical plug is moving downward, tending to empty or draw away the glass in said channel.

Modifications may be resorted to within the spirit and scope of our invention.

What we claim is:

1. In a glass feeding device, the combination of a container for molten glass having a plurality of outlet openings therein through which the glass may issue, a horizontally disposed regulator within the glass associated alternately with said openings, and successively partially entering each opening, and means to reciprocate said regulator in alignment with said openings.

2. In a glass feeding apparatus, the combination of a container for molten glass having a conduit extending laterally therefrom and terminating in a downwardly directed outlet opening in the bottom of the container, a regulator within the glass in alignment with the inner end of the conduit, means to reciprocate said regulator horizontally in alignment with the conduit and thereby cause the glass to issue through said outlet, and means to maintain the level of the glass in the container above the upper wall of the conduit, whereby the latter is continually filled with glass.

3. In a device for feeding molten glass, the combination of a container for the glass having oppositely disposed subways terminating in outlet openings, a regulator submerged in the glass in the container and cooperating with said subways, and means to actuate said regulator and cause it to exert an expelling force on the glass in said subways in alternation and thereby cause the glass to issue through said outlets.

4. In a device for feeding molten glass, the combination of a container for the glass having subways extending laterally therefrom and terminating in downwardly directed oppositely disposed outlet openings, a duplex regulator submerged in the glass comprising a pivoted oscillating bar formed at its lower extremity with a crosshead, the latter being so shaped as to partially enter the said outlet openings, and means to horizontally reciprocate said regulator and cause the glass to issue through said outlets in alternation.

5. In a device for feeding molten glass, the combination of a container having oppositely disposed outlet openings, a single mechanical expelling device associated alternately with each opening, and so shaped as to partially enter said openings, and means to actuate said regulator to cause an alternate issuance of glass from said outlets.

6. In a device for feeding molten glass, the combination of a container having oppositely disposed outlet openings, a submerged T-shaped double acting regulator associated alternately with each opening, and operating in close proximity to the bottom of the container between the said outlets, and means cooperating with the said regulator to cause a succession of charges to issue alternately from said outlets in propulsive and retractive impulses.

7. The combination of a container for molten glass, outlet openings in the bottom thereof and spaced apart, a duplex submerged regulator interposed between said outlets, said regulator being T-shaped and so shaped as to permit a partial entrance thereof into said openings, and means to reciprocate said regulator horizontally.

8. The combination of a container for molten glass, outlet openings in the bottom thereof and spaced apart, a submerged oscillating regulator interposed in the glass between said outlets, said regulator being of form similar to an inverted T, and means actuated by and cooperating with said regulator to alternately accelerate and retard the flow of glass through said outlets.

9. Apparatus for delivering formed charges of molten glass, comprising the combination of a container for the glass, outlet conduits extending through the walls of said container and through which the glass is discharged, mechanical expelling devices associated respectively with said conduits, and automatic means for actuating said devices and thereby exerting periodic expelling forces on the glass flowing through said conduits, said forces being applied at the two conduits in alternation, said actuating means comprising connections between the said devices by which the position of either device determines the position of the other.

10. Apparatus for delivering formed charges of molten glass, comprising the combination of a container for the glass, outlet conduits extending through the walls of said container and through which the glass is discharged, mechanical expelling devices associated respectively with said conduits, automatic means for actuating said devices and thereby exerting periodic expelling forces on the glass flowing through said conduits, said forces being applied at the two conduits in alternation, said actuating means comprising connections between said devices by which the position of either said device determines the position of the other said device, said conduits terminating in downwardly directed outlet orifices from which the issuing glass is suspended, and shears operating periodically in synchronism with said expelling forces to sever the suspended charges of glass.

11. Apparatus for delivering formed charges of molten glass, comprising the combination of a container for the glass, outlet channels extending through the walls of said container and through which the glass is discharged, and a single regulating means comprising a T-shaped pivoted bar having its lateral extensions so shaped as to partially enter the said channels within the glass movable back and forth between the channels to effect a periodic expelling force alternately on the portions of glass flowing through said channels.

12. Apparatus for delivering formed charges of molten glass, comprising the combination of a container for the glass, outlet conduits extending through the walls of said container and through which the glass is discharged, an arm projecting downwardly into the glass between said channels, a cross-head on said arm, and means for oscillating said arm and causing the ends of said head to enter said conduits alternately, thereby effecting propulsive and retractive impulses therein.

13. The combination of a container for molten glass having conduits extending outward through the side walls of the container and terminating in downwardly directed outlet orifices, a single regulator within the container so shaped as to partially enter successively the inner ends of said conduits for periodically applying controlling forces to the glass issuing from said orifices, and means to maintain the level of the glass in the container above the upper wall of the conduit, whereby the latter is continually filled with glass.

14. The combination of a container for molten glass having conduits extending outward through the side walls of the container and terminating in downwardly directed outlet orifices, a single regulator arranged to alternately accelerate and retard flow of glass through the conduits, mechanical expelling devices respectively associated with each conduit, automatic means for actuating said regulator and devices, thereby periodically applying expelling and retarding forces on the glass flowing through said conduits, and means to maintain the level of the glass in the container above the upper wall of the conduit, whereby the latter is continually filled with glass.

15. The combination of a container for molten glass having conduits extending outward through the side walls of the container and terminating in downwardly directed outlet orifices, mechanical expelling devices respectively associated with the said conduits, a single automatic means actuating said devices for periodically applying expelling forces to the glass flowing through said conduits, said forces being applied alternately to the glass in the two conduits, and means to maintain the level of the glass in the container above the upper wall of the conduit, whereby the latter is continually full of glass.

16. The combination of a container for molten glass having passageways through which the glass is discharged, mechanical expelling devices respectively associated with said passageways, and means connecting together the said devices and operable so that the position of one device determines the position of the other, for applying expelling forces to the discharging glass alternately at the two passageways, said means also operable to apply a retracting force to the glass at each channel while the expelling force is being applied to the glass at the other channel.

17. In combination, containing means for molten glass having downwardly directed outlets, regulating plugs projecting downward into the glass over said outlets, and means actuated by a pendulum regulator operating within the glass between the said openings for periodically reciprocating said plugs, including connections between the plugs, whereby as each plug is moved downward, the other plug is moved upward.

18. In combination, containing means for molten glass having downwardly directed outlets, regulating devices cross-connected together and individual to the outlets, and means to actuate said regulating devices in alternation to thereby apply expelling forces alternately to the glass issuing from said outlets, said actuating means comprising a pivoted yoke having its ends respectively connected to the said devices.

19. In combination, containing means for molten glass having downwardly directed outlets, regulating devices cross-connected together individual to the outlets, means to actuate said regulating devices in alternation to thereby apply expelling forces alternately to the glass issuing from said outlets, and means directly actuating the said last-mentioned means cooperating with said regulating devices to cause a periodic or wave movement of glass alternately away from said outlets in synchronism with said expelling forces.

20. The combination of means for containing molten glass, comprising channels extending laterally therefrom and opening into wells terminating at their lower ends in downwardly directed outlet openings, regulating plugs projecting into said wells, and automatic means comprising a pivoted rocker-arm connected to the said plugs for periodically moving said plugs up and down, the movements of the plugs being in alternation.

21. The combination of means for containing molten glass, comprising channels extending laterally therefrom opening into wells terminating at their lower ends in submerged downwardly directed outlet openings, regulating plugs projecting downward into said wells, automatic means comprising a pivotally mounted rocker-arm connected to said plugs for periodically moving said plugs up and down, the movements of the plugs being in alternation, and auxiliary regulating means to periodically control the supply of glass to the wells, comprising a double acting pendulum regulator coacting with and directly actuating the first mentioned means.

22. The combination of means for containing molten glass, comprising wells terminating at their lower ends in downwardly directed outlet openings, regulating plugs projecting downward into said wells, automatic means comprising a pivotally mounted rocker-arm connected to said plugs for periodically moving said plugs up and down, the movements of the plugs being in alternation, means providing passageways through which the glass is supplied to the wells, an auxiliary regulating device actuating the first mentioned means, and means to move it periodically back and forth toward said passageways alternately in timed relation to the up and down movements of the regulating plugs.

23. The combination of a container for molten glass comprising a main compartment or chamber, horizontally spaced auxiliary chambers having outlet openings in the bottoms thereof, passageways leading from the main chamber to said auxiliary chambers, and regulating means within said main chamber associated with said passageways and so shaped as to partially enter said passageways, and operable to apply periodic regulating forces to the glass passing through said passageways, said forces being applied to the passageways alternately.

24. In a glass feeding device, the combination of a container for molten glass having a lateral conduit opening into a downwardly directed outlet, means periodically accelerating and retarding flow of glass through the conduit into the outlet, and means in the outlet operable in timed relation with the first named means for accelerating issue of glass through the outlet during the period of flow retardation by the first named means.

25. In a glass feeding device, the combination of a container for molten glass having a lateral conduit opening into a downwardly directed outlet, means periodically accelerating and retarding flow of glass through the conduit into the outlet, means in the outlet operable in timed relation with the first named means for accelerating issue of glass through the outlet during the period of flow retardation by the first named means, and a single means for operating the several flow control means in timed relation with each other.

26. Apparatus for feeding mold charges of molten glass comprising a container for the glass, a closed discharge spout projecting from said container, said spout having a lateral inlet arranged to communicate with the glass in said container and having a downwardly opening outlet, an oscillable impeller in said container, means for oscillating said impeller laterally toward and away from the inlet of said discharge spout, and shears adapted to close beneath the outlet of said spout, in timed relation to the movements of said impeller, to sever mold charges from the glass periodically discharged through said spout by said impeller.

27. Apparatus for feeding molten glass, comprising a container for the glass having a submerged lateral discharge outlet, a closed discharge spout communicating with the outlet, said spout being curved outwardly and downwardly from the container and terminating in a downwardly opening discharge outlet, an impeller in said container, means for periodically moving said impeller laterally toward and from the inlet of said spout to alternately expel glass through the spout and to retract the glass at the discharge opening of said spout, and shears mounted to close beneath the spout outlet for severing mold charges from the glass periodically discharged from said spout.

28. Apparatus for feeding mold charges of molten glass, comprising a container for the glass having a submerged lateral discharge outlet, a spout communicating with said outlet and terminating in a downwardly opening orifice, an impeller disposed in said container, the said impeller having a rounded projection at its lower end adapted to enter the inlet portion of said spout, means for periodically oscillating the impeller toward and from the outlet, and means for severing mold charges from the glass discharged from said spout at each oscillation of the impeller.

In witness whereof we have hereunto affixed our signatures, the 21 and 24 days of March, 1924.

VICTOR E. HOFMANN.
LEONARD D. SOUBIER.